United States Patent
Horii (10) Patent No.: US 10,934,686 B2
(45) Date of Patent: Mar. 2, 2021

(54) WORKING MACHINE

(71) Applicant: KUBOTA CORPORATION, Osaka (JP)

(72) Inventor: Hiroshi Horii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/711,017

(22) Filed: Dec. 11, 2019

(65) Prior Publication Data

US 2020/0115886 A1    Apr. 16, 2020

Related U.S. Application Data

(63) Continuation of application No. PCT/JP2018/015721, filed on Apr. 16, 2018.

(30) Foreign Application Priority Data

Jun. 29, 2017    (JP) .............................. JP2017-127527

(51) Int. Cl.
| | |
|---|---|
| *E02F 9/22* | (2006.01) |
| *F15B 21/08* | (2006.01) |
| *F15B 11/17* | (2006.01) |

(52) U.S. Cl.
CPC .......... *E02F 9/2203* (2013.01); *E02F 9/2296* (2013.01); *F15B 11/17* (2013.01); *F15B 21/08* (2013.01); *F15B 2211/75* (2013.01)

(58) Field of Classification Search
CPC ........................... E02F 9/2203; F15B 2211/75
See application file for complete search history.

(56) References Cited

U.S. PATENT DOCUMENTS

| | | | | |
|---|---|---|---|---|
| 5,317,871 | A | * 6/1994 | Ito .......................... | E02F 9/2228 60/423 |
| 5,630,317 | A | * 5/1997 | Takamura .............. | E02F 9/2228 60/445 |
| 10,287,751 | B2 | * 5/2019 | Mori ...................... | E02F 9/2225 |

(Continued)

FOREIGN PATENT DOCUMENTS

| | | |
|---|---|---|
| JP | 2002-179387 A | 6/2002 |
| JP | 2014-190235 A | 10/2014 |

(Continued)

*Primary Examiner* — Michael Leslie
(74) *Attorney, Agent, or Firm* — Birch, Stewart, Kolasch & Birch, LLP (57) ABSTRACT

A working machine includes a prime mover, a hydraulic pump to be driven by power of the prime mover to output operation fluid, a hydraulic actuator to be actuated by the operation fluid outputted from the hydraulic pump, a first setting member to accept selection of a set revolving speed of the prime mover, a second setting member to accept selection of a set speed of the hydraulic actuator, a revolving speed controller portion to control operation of the prime mover based on the set revolving speed, and a speed controller portion to control operation of the hydraulic actuator based on the set speed. The speed controller portion being configured to change an operation speed of the hydraulic actuator in accordance with the set revolving speed accepted by the first setting member, the operation speed of the hydraulic actuator corresponding to the set speed accepted by the second setting member.

6 Claims, 8 Drawing Sheets

(56) References Cited

U.S. PATENT DOCUMENTS

| | | | |
|---|---|---|---|
| 10,767,345 B2 * | 9/2020 | Hata | ............... F15B 21/087 |
| 2002/0073699 A1 | 6/2002 | Nishimura et al. | |
| 2015/0135693 A1 | 5/2015 | Murakami et al. | |
| 2017/0356163 A1 | 12/2017 | Hita et al. | |
| 2020/0056351 A1 * | 2/2020 | Ono | ............... E02F 9/2292 |

FOREIGN PATENT DOCUMENTS

| | | |
|---|---|---|
| JP | 2016-135951 A | 7/2016 |
| WO | WO 2014/192161 A1 | 12/2014 |

* cited by examiner

FIG. 1

| Switching position | Revolving speed | | Speed | | | | |
|---|---|---|---|---|---|---|---|
| | Rev. speed (rpm) | Rate (%) | N1(G1) | N2(G2) | N3(G3) | N4(G4) | N5(G5) |
| R7 | 2400 | 100 | LO | MID | HI | HI | CR |
| R6 | 2200 | 92 | LO | MID | HI | HI2 | CR |
| R5 | 2000 | 83 | LO | MID | HI | MID | CR |
| R4 | 1800 | 75 | LO | MID | HI | MID2 | CR |
| R3 | 1600 | 67 | LO | MID | HI | MID3 | CR |
| R2 | 1400 | 58 | LO | LO | MID | MID4 | CR |
| R1 | 1200 | 50 | LO | LO | LO | LO | CR |

FIG. 2A

|  | Working machine speed (%) | Turn speed (rpm) | Memo |
|---|---|---|---|
| HI | 100 | 9.5 | |
| HI2 | 92 | 8.8 | |
| MID | 84 | 8 | |
| MID2 | 80 | 7.6 | |
| MID3 | 76 | 7.2 | |
| MID4 | 72 | 6.8 | |
| LO | 68 | 6.5 | |
| CR | 68 | 6.5 | Stop bucket dumping |

WORKING MACHINE

CROSS-REFERENCE TO RELATED APPLICATIONS

The present application is a continuation application of International Application No. PCT/JP2018/015721, filed Apr. 16, 2018, which claims priority to Japanese Patent Application No. 2017/127527, filed Jun. 29, 2017. The contents of these applications are incorporated herein by reference in their entirety.

BACKGROUND OF THE INVENTION

Field of the Invention

The present invention relates to a working machine such as a backhoe.

Description of Related Art

A working machine disclosed in Japanese Unexamined Patent Application Publication No. 2014-190235 is previously known.

The working machine disclosed in Japanese Unexamined Patent Application Publication No. 2014-190235 includes a traveling device to be driven by an engine, a working device for performing operation, and a control device to control a revolving speed of the engine based on first to third control characteristic lines indicating relations between an operation extent of an accelerator pedal and an engine revolving speed. The control device has a first engine revolving speed control portion to control, during operation of the working device, the revolving speed of the engine based on the first control characteristic line that prioritizes the working machine speed, a second engine revolving speed control portion to control, during the traveling, the revolving speed of the engine based on the second control characteristic line that prioritizes the fuel saving when a traveling load is smaller a predetermined load, and a third engine revolving speed control portion to control, during the traveling, the revolving speed of the engine based on the third control characteristic line positioned between the first control characteristic line and the second control characteristic line when the traveling load is the predetermined load or more.

SUMMARY OF THE INVENTION

A working machine according to one aspect of the present invention comprises: a prime mover; a hydraulic pump to be driven by power of the prime mover to output operation fluid; a hydraulic actuator to be actuated by the operation fluid outputted from the hydraulic pump; a first setting member to accept selection of a set revolving speed of the prime mover; a second setting member to accept selection of a set speed of the hydraulic actuator; a revolving speed controller portion to control operation of the prime mover based on the set revolving speed; and a speed controller portion to control operation of the hydraulic actuator based on the set speed. The speed controller portion being configured to change an operation speed of the hydraulic actuator in accordance with the set revolving speed accepted by the first setting member, the operation speed of the hydraulic actuator corresponding to the set speed accepted by the second setting member.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

A more complete appreciation of the invention and many of the attendant advantages thereof will be readily obtained as the same becomes better understood by reference to the following detailed description when considered in connection with the accompanying drawings, wherein:

Hereinafter, an embodiment of the present invention will be described with reference to the drawings as appropriate.

Figure 7:
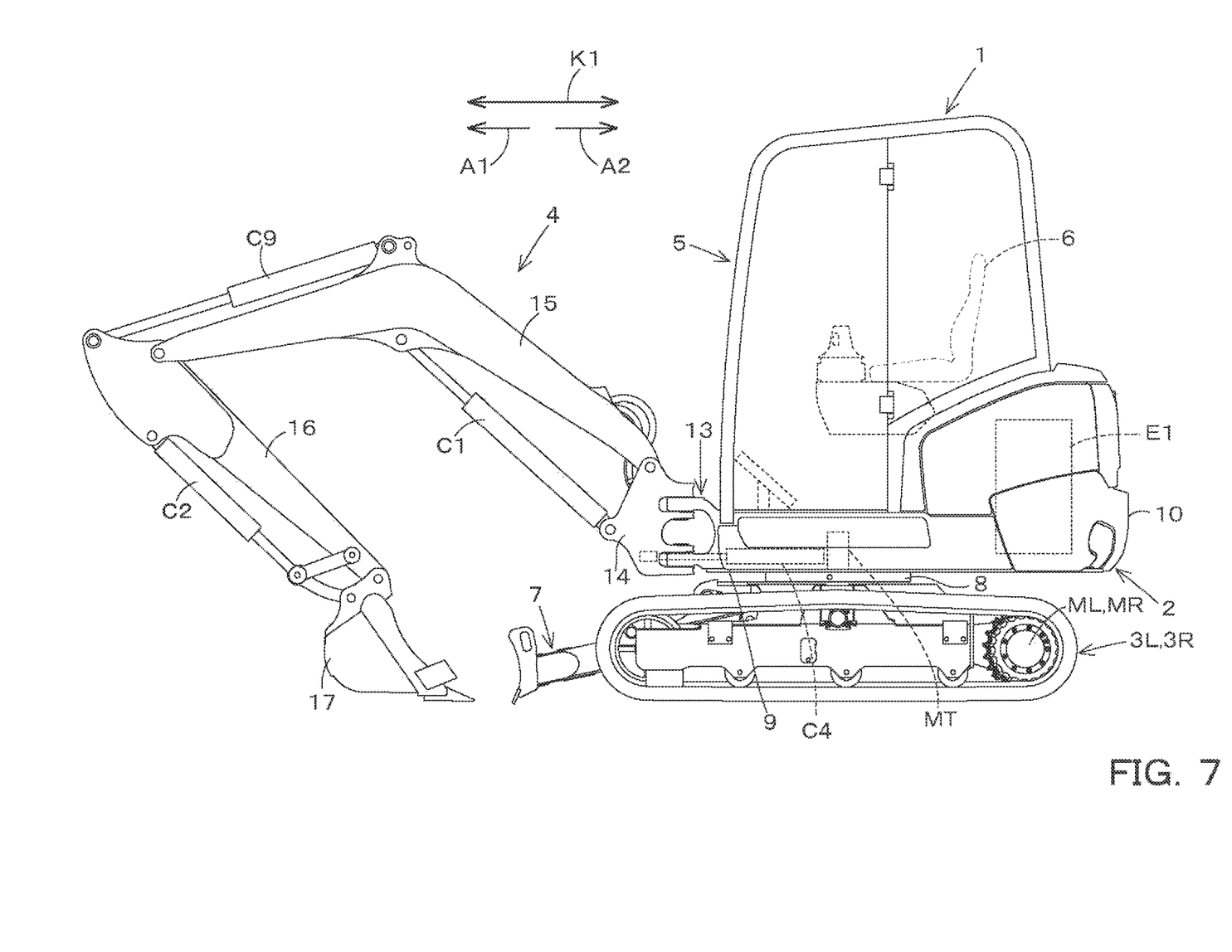
FIG. 7 is a whole side view of a backhoe according to the embodiment.

FIG. 7 is a schematic side view showing the overall configuration of the working machine 1. In the present embodiment, a backhoe is exemplified as the working machine 1. The working machine 1 may be a front loader, a skid steer loader, a compact truck loader, or the like.

First, the overall configuration of the working machine 1 will be described below.

As shown in FIG. 7, the working machine 1 includes a machine body (a turn base) 2, a first traveling device 3R, a second traveling device 3L, and a working device 4. A cabin 5 is mounted on the machine body 2. An operator seat (seat) 6 on which a driver (an operator) is seated is provided in the cabin 5.

In the present embodiment, the front side of the operator seated on the operator seat 6 of the working machine 1 (the direction indicated by an arrowed line A1 in FIG. 7) is referred to as the front, the rear side of the operator (the direction indicated by an arrowed line A2 in FIG. 7) is referred to as the rear, the left side of the operator (the front surface side of FIG. 7) is referred to as the left, and the right side of the operator (the back surface side of FIG. 7) is referred to as the right. In addition, the horizontal direction, which is a direction orthogonal to the front-rear direction K1, will be described as the machine width direction.

As shown in FIG. 7, the first traveling device 3R is arranged on the right side with respect to the machine body 2, and the second traveling device 3L is arranged on the left side with respect to the machine body 2. In the present embodiment, the first traveling device 3R and the second traveling device 3L are traveling mechanisms of a crawler type (crawler-type traveling devices). The first traveling device 3R and the second traveling device 3L are driven by traveling motors MR and ML that are traveling hydraulic actuators. A dozer device 7 is attached to the front portions of both the first traveling device 3R and the second traveling device 3L. The dozer device 7 stretches and shortens a dozer cylinder C3 described later to move up and down (to lift and lower the blade).

The machine body 2 is supported on a traveling frame via a turn bearing 8 so as to be able to turn about a vertical axis (an axis extending in the vertical direction). The machine body 2 is driven to turn by a turn motor MT constituted of a hydraulic motor (a hydraulic actuator). The machine body 2 includes a base plate 9 (hereinafter referred to as a turn base plate) that turns around a vertical axis, and includes a weight 10. The turn base plate 9 is formed of a steel plate or the like, and is connected to the turn bearing 8. The weight 10 is provided at the rear portion of the machine body 2. The machine body 2 is provided with a prime mover E1. The prime mover E1 is an engine. The prime mover E1 may be an electric motor or may be a hybrid type having the engine and the electric motor.

The machine body 2 has a support bracket 13 arranged at a front portion slightly to the right from the center in the machine width direction. A swing bracket 14 is attached to the support bracket 13 so as to be swingable around the vertical axis. The working device 4 is attached to the swing bracket 14.

The working device 4 includes a boom 15, an arm 16, and a bucket (a working tool) 17. The base portion of the boom 15 is pivotally attached to the swing bracket 14 so as to be rotatable about the horizontal axis (an axis extending in the machine width direction). In this manner, the boom 15 can swing up and down. The arm 16 is pivotally attached to the tip end portion of the boom 15 so as to be rotatable about the horizontal axis. In this manner, the arm 16 can swing back and forth or up and down. The bucket 17 is provided on the tip end portion of the arm 16 so as to perform a shoveling operation and a dumping operation. Another working tool (a hydraulic attachment) that can be driven by a hydraulic actuator can be attached to the working machine 1 instead of or in addition to the bucket 17. Examples of other working tools include a hydraulic breaker, a hydraulic crusher, an angle broom, an earth auger, a pallet fork, a sweeper, a mower, and a snow blower.

The swing bracket 14 is capable of being swung by the stretching and shortening of the swing cylinder C4 provided in the machine body 2. The boom 15 is capable of being swung by the stretching and shortening of the boom cylinder C1. The arm 16 is capable of being swung by the stretching and shortening of the arm cylinder C9. The bucket 17 is capable of performing the shoveling operation and the dumping operation due to the stretching and shortening of the bucket cylinder (a working tool cylinder) C2. Working hydraulic actuators such as the swing cylinder C4, the boom cylinder C1, the arm cylinder C9, and the bucket cylinder C2 are constituted of hydraulic cylinders.

Figure 1:
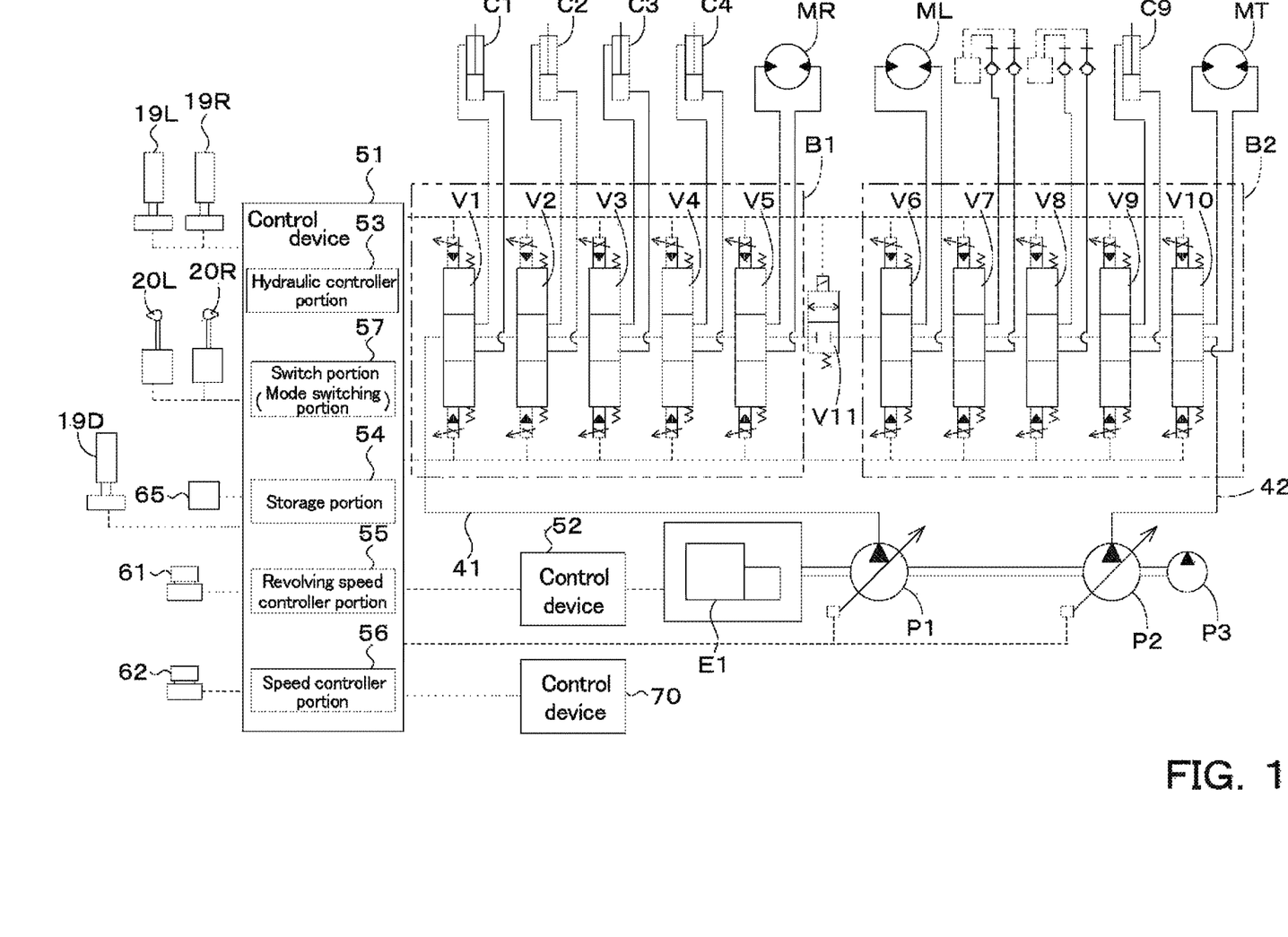
FIG. 1 is a schematic configuration view of a hydraulic system for a working machine and a control system according to an embodiment of the present invention.

FIG. 1 shows a hydraulic system for the working machine 1 and a control system thereof. The hydraulic system for the working machine 1 includes a first hydraulic pump P1, a second hydraulic pump P2, a third hydraulic pump P3, and a plurality of control valves V1 to V10. The first hydraulic pump P1 and the second hydraulic pump P2 are constituted of variable displacement hydraulic pumps. The third hydraulic pump P3 is a constant displacement hydraulic pump. The first hydraulic pump P1, the second hydraulic pump P2, and the third hydraulic pump P3 are configured to be driven by the power of the prime mover E1, and to output the operation fluid stored in the operation fluid tank. In this embodiment, the hydraulic system for the working machine 1 includes three hydraulic pumps (the first hydraulic pump P1, the second hydraulic pump P2, and the third hydraulic pump P3), but the number thereof is not limited to three.

The plurality of control valves V1 to V10 are valves (electromagnetic control valves) configured to control the flow rate of operation fluid to be supplied to the hydraulic actuators (the working hydraulic actuators, the traveling hydraulic actuators), respectively. The plurality of control valves V1 to V10 are constituted of electromagnetic three-position switching valves whose spool positions are switched by the operation fluid (pilot fluid) supplied from the third hydraulic pump P3. That is, each of the plurality of control valves V1 to V10 has an electromagnetic valve to change the pressure of pilot fluid acting on the spool depending on the opening aperture of the electromagnetic valve, and thereby the position of the spool can be changed. In addition, in this embodiment, although the electromagnetic three-position switching valve incorporating the electromagnetic valve is shown, the electromagnetic valve may be configured separately from the three-position switching valve. In addition, the plurality of control valves V1 to V10 may be constituted of two-position switching valves, four-position switching valves, and the like other than the three-position switching valve, and are not limited thereto.

This embodiment employs, as the control valves V1 to V10, a boom control valve V1 for controlling the boom cylinder C1, a bucket control valve V2 for controlling the bucket cylinder C2, a dozer control valve V3 for controlling the dozer cylinder C3, a swing control valve V4 for controlling the swing cylinder C4, a right traveling control valve V5 for controlling the traveling hydraulic actuator (the traveling motor MR) of the first traveling device 3R, a left traveling control valve V6 for controlling the traveling hydraulic actuator (the traveling motor ML) of the second traveling device 3L, a first SP control valve V7 for controlling the auxiliary actuator, a second SP control valve V8 for controlling the auxiliary actuator, an arm control valve V9 for controlling the arm cylinder C9, and a turn control valve V1 for controlling the turn motor MT.

The boom control valve V1, the bucket control valve V2, the dozer control valve V3, the swing control valve V4, and the right traveling control valve V5 are connected to the first output fluid tube 41 connected to the first hydraulic pump P1. The left traveling control valve V6, the first SP control valve V7, the second SP control valve V8, the arm control valve V9, and the turn control valve V10 are connected to the second output fluid tube 42 connected to the second hydraulic pump P2.

Hereinafter, for convenience of the explanation, the group of the boom control valve V1, the bucket control valve V2, the dozer control valve V3, the swing control valve V4, and the right traveling control valve V5 may be referred to as a first block B1. The group of the left traveling control valve V6, the first SP control valve V7, the second SP control valve V8, the arm control valve V9, and the turn control valve V10 may be referred to as a second block B2.

A communication valve V11 is provided between the first block B1 and the second block B2. The communication valve V11 is a switching valve configured to be switched between a first position and a second position, and connected to a first output fluid tube 41 and to a second output fluid tube 42. When the communication valve V11 is in the first position, the first output fluid tube 41 and the second output fluid tube 42 are connected through the communication valve V11, and when the communication valve V11 is in the second position, the communication between the first output fluid tube 41 and the second output fluid tube 42 is blocked by the communication valve V11. The communication valve V11 may be constituted of a three-position switching valve, a four-position switching valve, or the like other than the two-position switching valve, and is not limited thereto.

The working machine 1 includes a turn device. The turn device is a device including a machine body (a turn base) 2, a turn motor MT, and a hydraulic pump (a first hydraulic pump P1 and a second hydraulic pump P2).

Next, the configuration of the control system for the working machine 1 will be described.

As shown in FIG. 1, the control system of the working machine 1 includes a plurality of control devices 51 and 52. The control device 51 is an operating control device configured to mainly control the hydraulic system, and includes a hydraulic controller portion 53. The hydraulic controller portion 53 is constituted of an electronic/electric circuit, a computer program, and the like provided in the control device 51. The hydraulic controller portion 53 controls hydraulic equipment provided in the working machine 1, for example, the plurality of control valves V1 to V10, the communication valve V11, and the hydraulic pumps (the first hydraulic pump P1 and the second hydraulic pump P2). The hydraulic controller portion 53 may be constituted of anything as long as it controls the hydraulic device, and the control target is not limited to the hydraulic device of this embodiment. The control device 52 controls the prime mover E1. In this embodiment, the control system includes a plurality of control devices 511 and 52. However, the control devices 51 and 52 may be constituted of one control device, and the number of the control device is not limited thereto.

The control device 51 is connected to working operation members (the working operation member 19L, the working operation member 19R, and the working operation member 19D). The working operation member 19L is arranged at a position where the operator (worker) can operate the working operation member 19L with the left hand, the working operation member 19R is arranged at a position where the operator can operate the working operation member 19R with the right hand, and the working operation member 19D is arranged at a position where the operator can operate the working operation member 19D with the right hand, separating from the working operation member 19R. Each of the working operation member 19L, and the working operation member 19R is a lever having a potentiometer (a detector device) configured to detect a swinging amount (an operation extent), and is swingable forward, backward, rightward, and leftward. The working operation member 19D is a lever having a potentiometer (a detector device) configured to detect a swinging amount (an operation extent), and is swingable forward, backward, rightward, and leftward.

When the operator operates the working operation member 19L, the operation extent and operation direction of the working operation member 19L are detected by the potentiometer, and the detected operation extent and detected operation direction are inputted to the control device 51. The hydraulic controller portion 53 magnetizes the solenoid of the turn electromagnetic valve of the turn control valve V10 in accordance with the operation extent and the operation direction of the working operation member 19L, controls the opening aperture of the turn electromagnetic valve or magnetizes a solenoid of an arm electromagnetic valve of the arm control valve V9, thereby controlling the aperture of the arm solenoid valve. As the result, the pilot pressure acts on the pressure receiving portion of the turn control valve V10, the position of the turn control valve V10 is switched, the rotation direction of the turn motor MT is switched according to the position or the pilot pressure is applied to the pressure receiving portion of the arm control valve V9, and the position of the arm control valve V9 is switched, thereby stretching and shortening the arm cylinder C9 in accordance with the position.

When the operator operates the working operation member 19R, the operation extent and operation direction of the working operation member 19R are detected by the potentiometer, and the detected operation extent and detected operation direction are inputted to the control device 51. The hydraulic controller portion 53 magnetizes the solenoid of the boom electromagnetic valve of the boom control valve V1 in accordance with the operation extent and the operation direction of the working operation member 19R, controls the opening aperture of the boom electromagnetic valve or magnetizes a solenoid of a bucket electromagnetic valve of the bucket control valve V2, thereby controlling the aperture of the bucket solenoid valve. As the result, the pilot pressure acts on the pressure receiving portion of the boom control valve V1, the position of the boom control valve V1 is switched, the boom cylinder C1 is stretched or shortened in accordance with the position or the pilot pressure is applied to the pressure receiving portion of the bucket control valve V2, and the position of the bucket control valve V2 is switched, thereby stretching and shortening the bucket cylinder C2 in accordance with the position.

When the operator operates the working operation member 19D, the operation extent and operation direction of the working operation member 19D are detected by the potentiometer, and the detected operation extent and detected operation direction are inputted to the control device 51. The hydraulic controller portion 53 magnetizes the solenoid of the dozer solenoid valve of the dozer control valve V3 in accordance with the operation extent and operation direction of the working operation member 19D, and controls the opening aperture of the dozer solenoid valve. As the result, the pilot pressure acts on the pressure receiving portion of the dozer control valve V3, the position of the dozer control valve V3 is switched, and thereby the dozer cylinder C3 is stretched and shortened in accordance with the position.

As described above, by operating the working operation members (the working operation member 19L, the working operation member 19R, the working operation member 19D), the machine body 2, the boom 15, the arm 16, the bucket (the working tool) 17, and the dozer device 7 are operated.

The traveling operation member (the traveling operation member 20L, the traveling operation member 20R) is connected to the control device 51. The traveling operation member 20L and the traveling operation member 20R are arranged in front of the operator seat 6. Each of the traveling operation member 20L and the traveling operation member 20R is a lever having a potentiometer (a detector device) configured to detect a swinging amount (an operation extent), and is a lever swingable forward and backward. The traveling operation member 20L and the traveling operation member 20R are not limited to the levers, and may be constituted of pedals, for example.

When the operator operates the traveling operation member 20L and the traveling operation member 20R, the operation extent and the operation direction of the traveling operation member 20L and the traveling operation member 20R are detected by the potentiometers, and the detected operation extent and detected operation direction are inputted to the control device 51. The hydraulic controller portion 53 magnetizes the solenoid of the left traveling electromagnetic valve of the left traveling control valve V6 according to the operation extent and operation direction of the traveling operation member 20L, and magnetizes the solenoid of the right traveling electromagnetic valve of the right traveling control valve V5 according to the operation extent and operation direction of the traveling operation member 20R. As the result, the pilot pressure acts on the pressure receiving portions of the right traveling control valve V5 and the left traveling control valve V6, the right traveling control valve V5 and the left traveling control valve V6 are switched, and thereby the rotating directions of the traveling motor MR and the traveling motor ML are determined.

As described above, when the working operation member (the working operation member 19L, the working operation member 19R, the working operation member 19D) and the traveling operation member (the traveling operation member 20L, the traveling operation member 20R) are operated, the control device 51 outputs the control signal for magnetizing and demagnetizing the solenoid, thereby controlling the machine body 2, the boom 15, the arm 16, the bucket (the working tool) 17, the dozer device 7, the first traveling device 3R, and the second traveling device 3L.

The first setting member 61 and the second setting member 62 are connected to the control device 51. The first setting member 61 is a member (a member for setting the revolving speed of the prime mover E1) for receiving the selection regarding the revolving speed setting of the prime mover E1. The second setting member 62 is a member (a member for setting the speed of the hydraulic actuator) for accepting the selection regarding the speed setting of the hydraulic actuator. The control device 51 includes the revolving speed controller portion 55, the speed controller portion 56, and the storage portion 54.

The first setting member 61 has a plurality of switching positions R for setting the revolving speed of the prime mover E1. In particular, the first setting member 61 is a dial switch such as a selector switch having a plurality of switching positions R, for example. A target value for the revolving speeds of the prime mover E1 is assigned to each of the plurality of switching positions R. In other words, the plurality of switching positions R of the first setting member 61 are associated with the revolving speeds of the prime mover E1. The configuration of the first setting member 61 is not limited to that, and may be realized by a combination of a display device and an operation member such as a jog dial or an operation button, or may be realized by a touch panel.

Figure 2A:
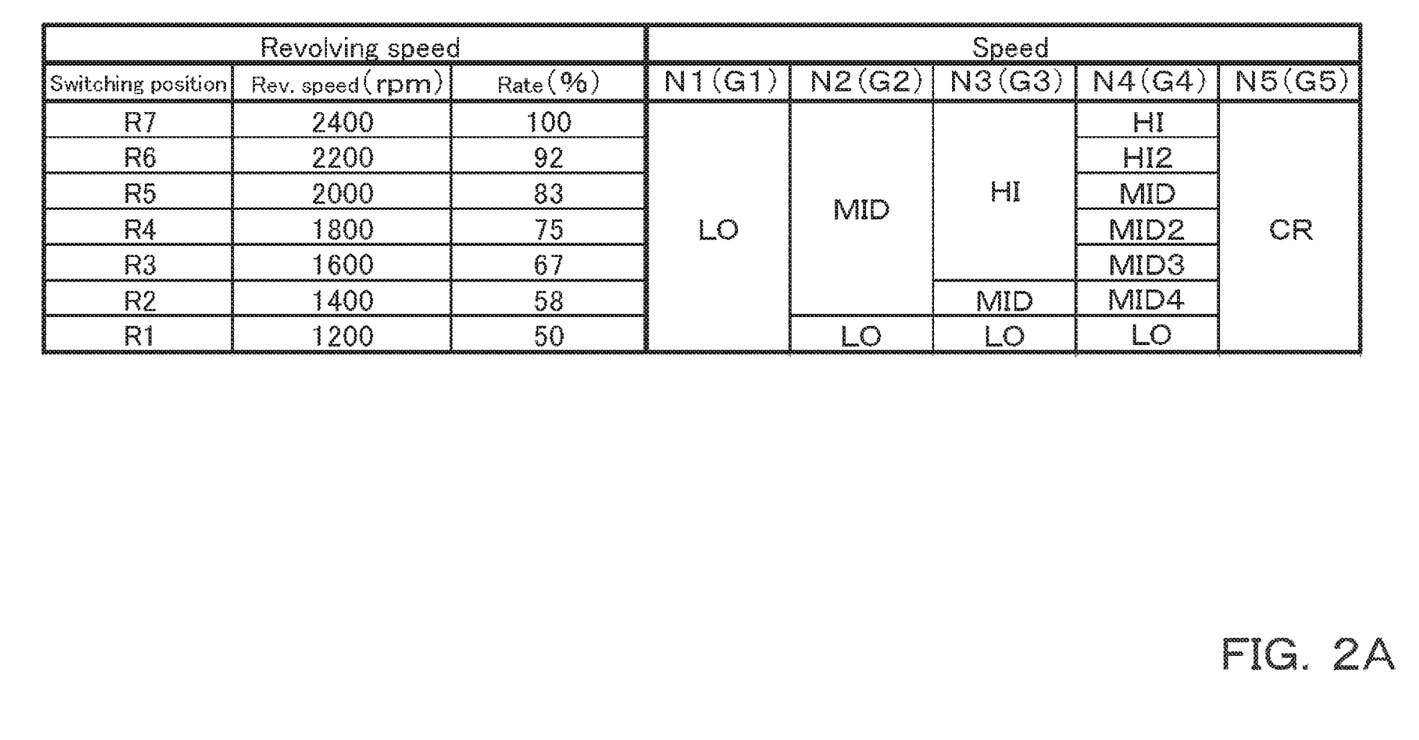
FIG. 2A is a view illustrating a switching position of a first setting member, a prime mover revolving speed, a ratio, and a speed according to the embodiment.

The target value of the revolving speed associated with each of the plurality of switching positions R is stored in the storage portion 54. For example, as illustrated in FIG. 2A, the table of the storage portion 54 stores the target value of the revolving speed associated with each of the plurality of switching positions R. The plurality of switching positions R of the first setting member 61 have seven positions. A target value of the revolving speed of the prime mover E1 is assigned to each of the seven positions. That is, as shown in FIG. 2A, the storage portion 54 stores the target value of the revolving speed of the prime mover E1 for each switching position R (R1 to R7). The operator switches the switching position R of the first setting member 61 to select a single target value for one revolving speed. An operation signal of the first setting member 61 is outputted to the revolving speed controller portion 55. The number of switching positions R is not limited to seven positions, and may be changed as appropriate.

The revolving speed controller portion 55 is constituted of an electronic/electric circuit, a computer program, and the like provided in the control device 51. The revolving speed controller portion 55 receives an operation signal outputted from the first setting member 61. The revolving speed controller portion 55 sets the revolving speed of the prime mover E1 based on the operation signal of the first setting member 61. That is, the revolving speed controller portion 55 increases or decreases the revolving speed of the engine E1 based on the operation of the first setting member 61. In particular, the revolving speed controller portion 55 reads the target value of the revolving speed stored in the storage portion 54 based on the operation signal of the first setting member 61. The revolving speed controller portion 55 controls the revolving speed of the prime mover E1 based on the target value of revolving speed obtained from the storage portion 54.

The second setting member 62 has a speed switching position N for setting the speed (the operation speed) of the hydraulic actuator. The second setting member 62 is, for example, a dial selector such as a selector switch having a plurality of speed switching positions N, and an operation speed is assigned to each of the speed switching positions N. The configuration of the second setting member 62 is not limited to that configuration, and may be realized by a combination of a display device and an operation member such as a jog dial or an operation button, or may be realized by a touch panel.

The storage portion 54 stores the speed levels (HI, HI2, MID, MID2, MID3, MID4, LO, CR) for each of combinations of the switching positions R (R1 to R7) and the speed switching positions N (N1 to N5).

For example, as shown in FIG. 2A, in the switching position R7 (the target value of the revolving speed of the speed of the prime mover E1, 2400 rpm), any one of the speed levels LO, MID, HI, and CR is allocated to the speed switching position N (N1 to N5). In addition, in the switching position R1 (the target value of the revolving speed of the speed of the prime mover E1, 1200 rpm), the speed levels LO and CR are allocated to the speed switching position N (N1 to N5). In this manner, as shown in FIG. 2A, the target value of the revolving speed of the prime mover E1 is set on the basis of the switching positions R1 to R7, and the speed level (HI, HI2, MID, MID2, MID3, MID4, LO, CR) is set on the basis of the combination of the switching positions R1 to R7 and the speed switching positions N1 to N5.

Figure 2B:
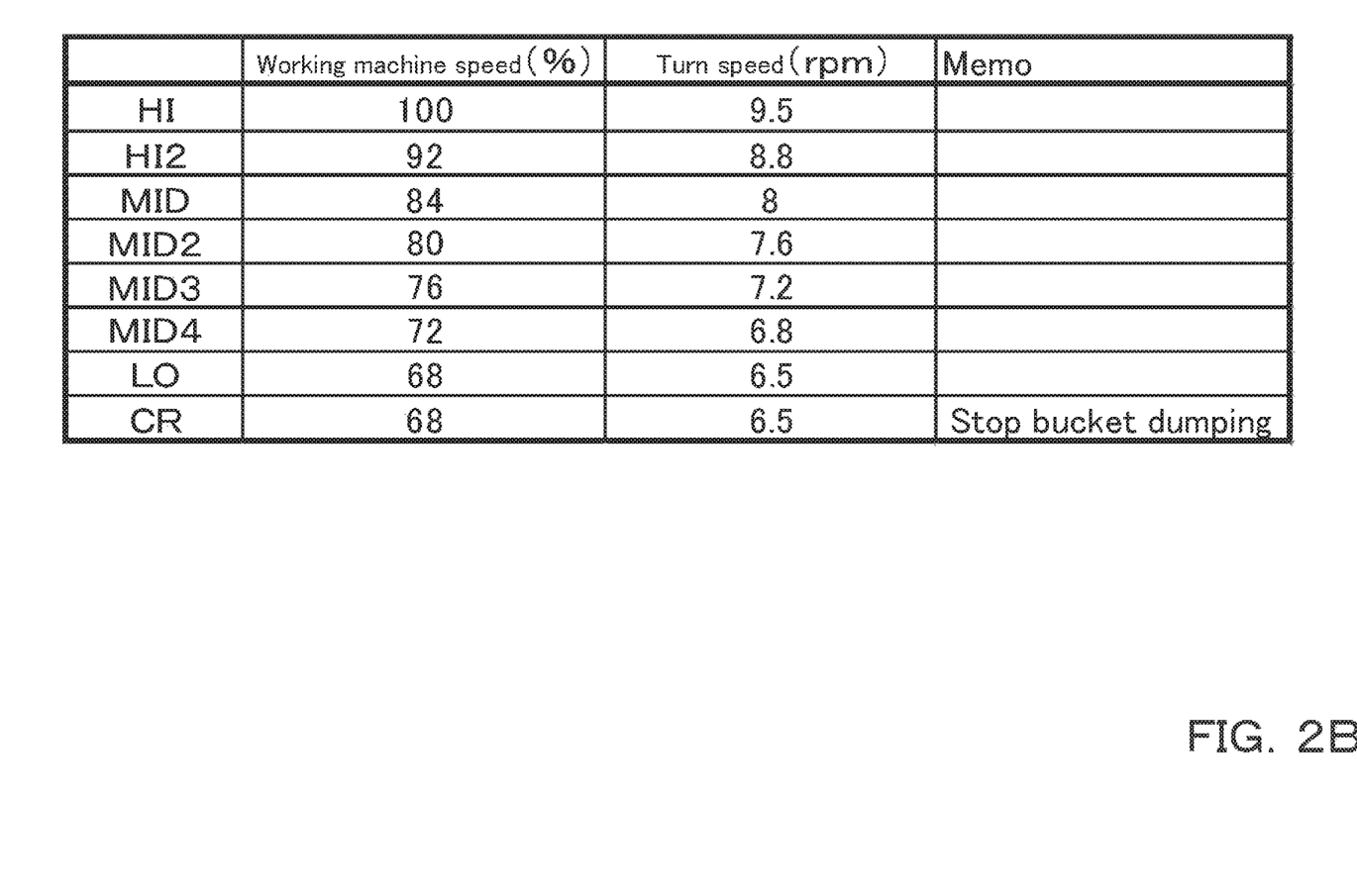
FIG. 2B is a view illustrating operation speeds (a working machine speed and a turn speed) in each of the speeds according to the embodiment.

As shown in FIG. 2B, the table of the storage portion 54 associates the plurality of speed levels (HI, HI2, MID, MID2, MID3, MID4, LO, CR) with the operation speeds respectively corresponding to the speed levels, and stores the speed levels and the operation speeds. That is, the working machine speed (the operation speed of each hydraulic cylinder of the working device) and the turn speed (the operation speed of the turn motor) are set corresponding to each of the plurality of speed levels. Hereinafter, for convenience of the explanation, the working machine speed and the turn speed may be referred to as the operation speed.

In this manner, the operation speed is set according to the combination of the switching position R for setting the revolving speed of the prime mover E1 and the speed switching position N for setting the speed level.

For example, when the switching position R is set to any of R3 to R7 and the speed switching position N is set to N3, or when the switching position R is set to R7 and the speed switching position N is set to N7, the speed level HI is selected, the working machine speed is set to 100% (the maximum speed), and the turn speed is set to 9.5 rpm.

Regardless of the setting of the switching position R, when the speed switching position N is set to N5, the speed level CR is selected, the working machine speed is set to 68% of the maximum speed, and the turn speed is set to 6.5 rpm. In this embodiment, when the speed level is CR, the dumping operation of the bucket 17 is stopped by maintaining the bucket control valve V2 at a predetermined position and restricting the stretching and shortening of the bucket cylinder C2.

The allocation of the speed levels HI, HI2, MID, MID2, MID3, MID4, LO, and CR to each combination of the switching position R and the speed switching position N shown in FIG. 2A in only an example, and may be changed as appropriate. In addition, the values of the working machine speed and the turn speed corresponding to each of the speed levels HI, HI2, MID, MID2, MID3, MID4. LO, and CR shown in FIG. 2B are just an example, and may be changed as appropriate.

The speed controller portion 56 is constituted of an electronic/electric circuit, a computer program, and the like provided in the control device 51, and sets an operation speed based on an operation signal inputted from the first setting member 61 and the second setting member 62. In particular, the speed level is selected based on the combination of the switching position R set by the first setting member 61 and the speed switching position N set by the second setting member 62, and the operation speed corresponding to the selected speed lever is read from the storage portion 54. Based on the operation speed read from the storage portion 54, the speed controller portion 56 magnetizes the solenoid valves of the control valves V1 to V10 on the basis of the control signals corresponding to the operation extents of the working operation members 19L, 19R, and 19D, and thereby controls the control valves V1 to V10. In particular, the maximum speed of the hydraulic actuator connected to each of the control valves V1 to V10 is controlled by changing the opening apertures of the control valves V1 to V10.

Figure 3:
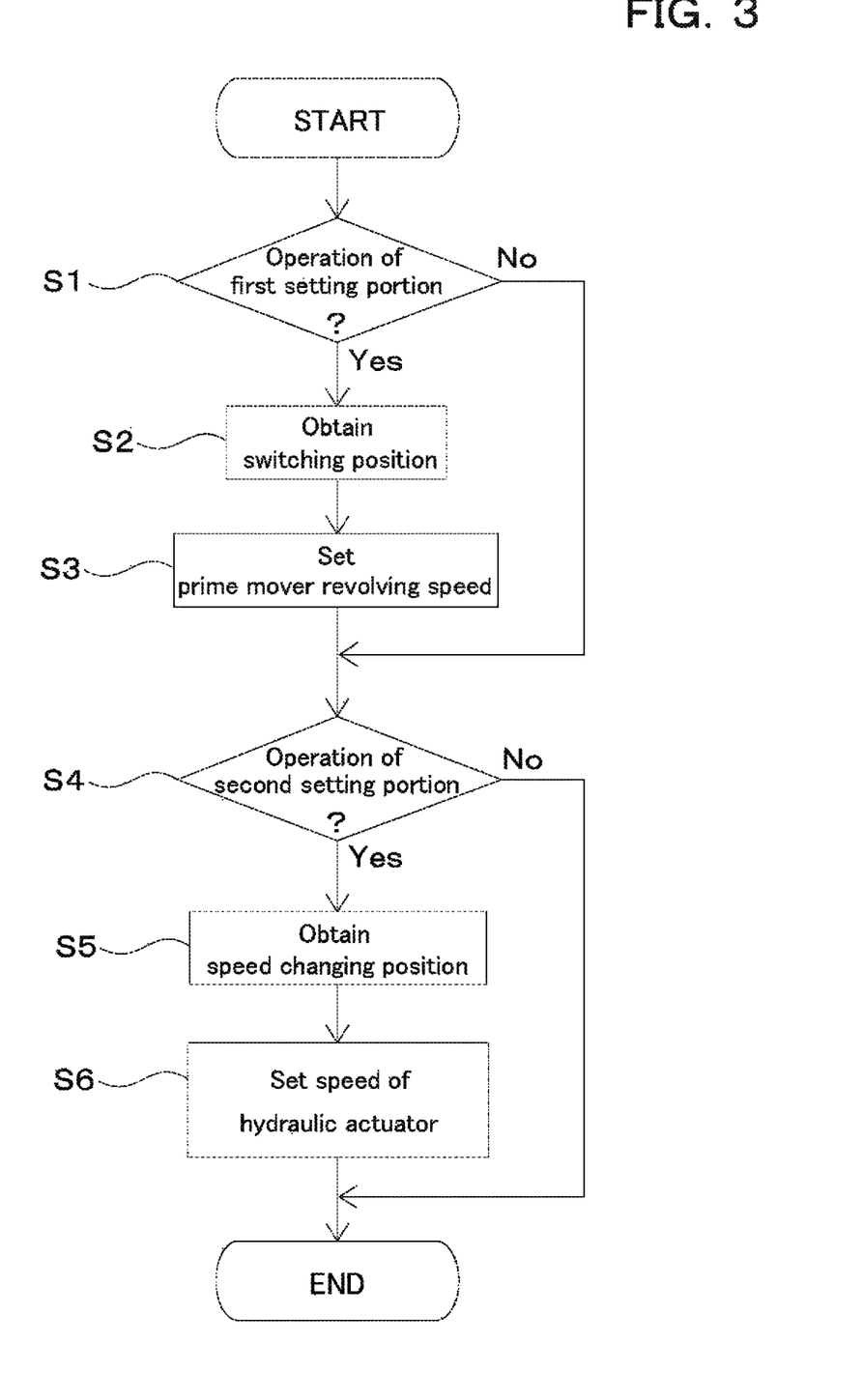
FIG. 3 is a view illustrating a flow of speed setting in a speed controller portion according to the embodiment.

FIG. 3 shows a first control flowchart. As shown in FIG. 3, when the first setting member 61 is operated (step S1, Yes), the revolving speed controller portion 55 acquires the switching position R of the first setting member 61 (step S2), refers to the target value corresponding to the switching position R among the target values of the revolving speeds of the prime mover E1 stored in the storage portion 54, and then sets the revolving speed of the prime mover E1 on the basis of the referenced target value of the revolving speed (step S3). In particular, the revolving speed controller portion 55 outputs the referenced revolving speed of the prime mover E1 to the control device 52. The hydraulic controller portion 53 maximizes the swash plate angle of the hydraulic pump. However, not limited to that, the hydraulic controller portion 53 may control the operation of the hydraulic pump in another control method such as load sensing control.

When the second setting member 62 is operated (step S4, Yes), the speed controller portion 56 acquires the speed switching position N of the second setting member 62 (step S5), refers to the speed level corresponding to the switching position R of the first setting member 61 and the speed switching position N of the second setting member 62 among the operation speed levels stored in the storage portion 54 (step S5), and sets the operation speed based on the referred speed level (step S6). In particular, the speed controller portion 56 outputs the set operation speed to the control device 52. The control device 52 (the speed controller portion 56) outputs a control signal corresponding to the operation extent of the working operation member to the solenoid valves of the control valves V1 to V10, and thereby controls the control valves V1 to V10. That is, the control device 52 changes the opening aperture of the control valves V1 to V10, and thereby changes the flow rate of the operation fluid to be supplied to the hydraulic actuator. In this manner, the speed controller portion 56 changes the operation speed to the speed corresponding to the referenced speed level.

This embodiment describes the configuration where the switching position R is set first and then the speed switching position N is set. However, the order of setting is not limited to that configuration. The speed switching position N may be set first, and then the switching position R may be set.

Figure 4:
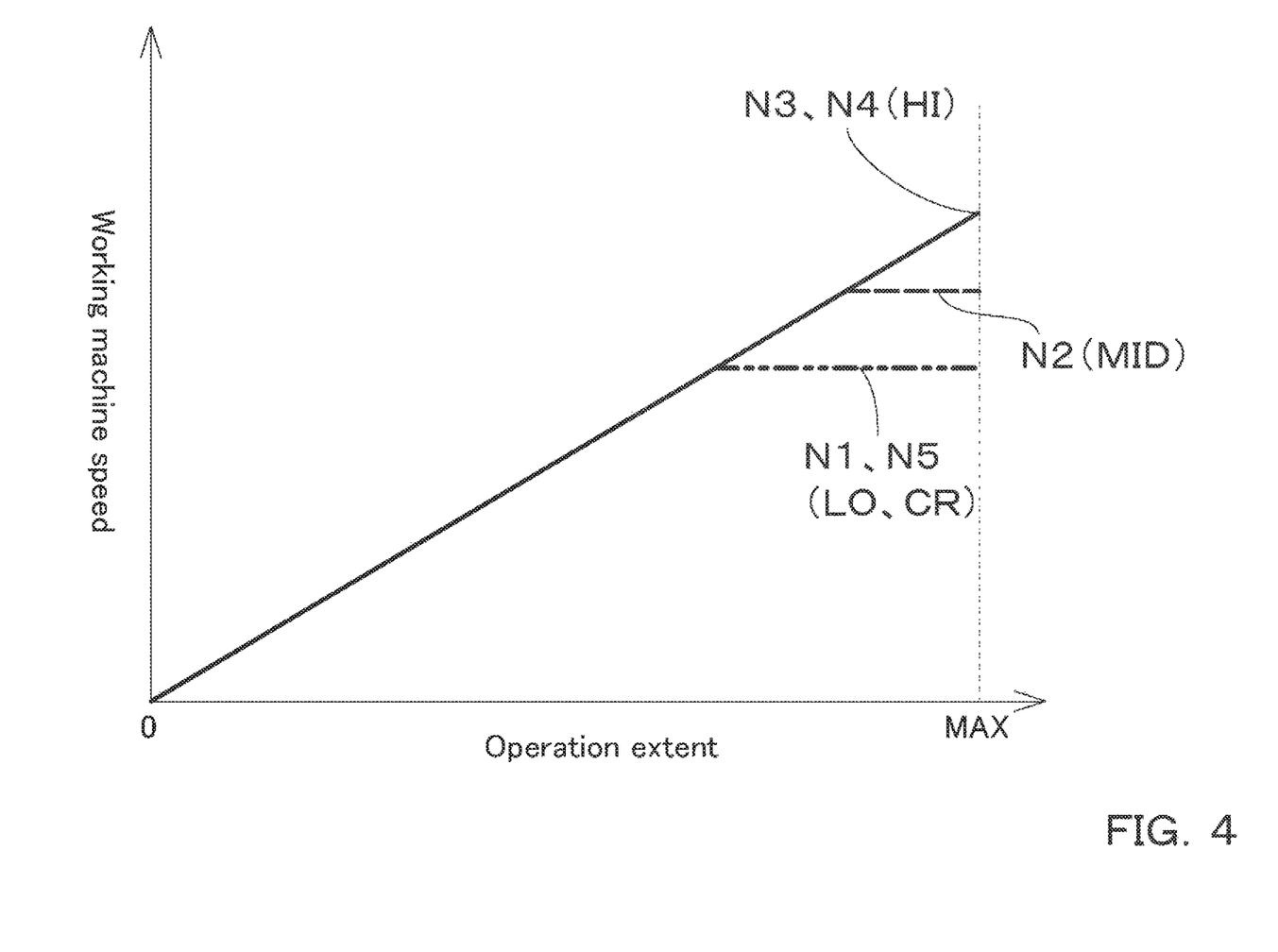
FIG. 4 is a view illustrating a relation between the speed and an operation extent of a working operation member in each of speed switching positions according to the embodiment.

FIG. 4 shows an example of the relation between the working machine speed and the operation extents of the working operation members 19L, 19R, and 19D corresponding to each of the speed switching positions N. In particular. FIG. 4 shows an example of the relation between the speed and the operation extents of the working operation members 19L, 19R, and 19D at each of the speed switching positions N under the condition where the switching position R of the first setting member 61 is R7. The horizontal coordinate of the graph shown in FIG. 4 is the operation extents of the working operation members 19L, 19R, and 19D, and the vertical coordinate is the working machine speed. When the speed switching positions N are N1, N5 (LO, CR), the working machine speed is maintained at 68% of the maximum speed if the operation extents of the working operation members 19L, 19R, 19D are 68% or more of the full stroke (the maximum operation extent). When the speed switching position N is N2 (MID), the working machine speed is maintained at 84% of the maximum speed, if the operation extents of the working operation members 19L, 19R, and 19D is 84% or more of the full stroke. When the speed switching positions N are N3, N4 (HI), the working machine speed is 100% (the maximum speed) when the operation extents of the working operation members 19L, 19R, 19D are in the full stroke.

The relation between the working machine speed and the operation extents of the working operation members 19L, 19R, and 19D is not limited to the example shown in FIG. 4. For example, the change in the working machine speed may be gradually reduced as the operation extent increases (the ratio of the increasing in the working machine speed with respect to the increasing in the operation extent is gradually reduced) without setting the working machine speed to 0 with the neutral range (the range of operation extent 0 to minute operation extent (for example, about several percent of the full stroke)) employed as the dead zone or without uniformly maintaining the working machine speed at the maximum speed under the state where the operation extent exceeds a predetermined value.

Figure 5:
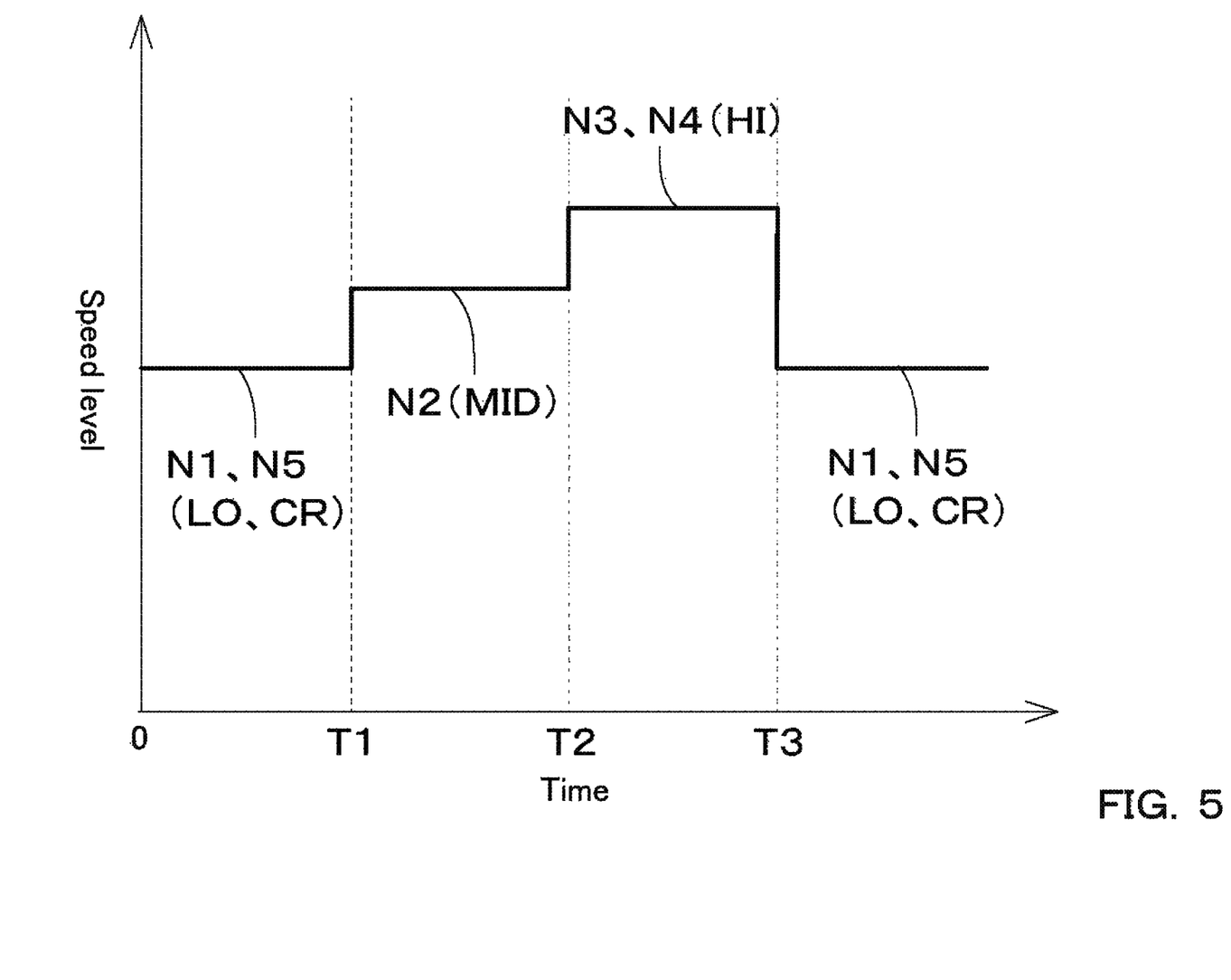
FIG. 5 is a view illustrating a relation between the speed and operation of a second setting member under a condition where the working operation member is in the maximum operation extent according to the embodiment.

FIG. 5 illustrates a graph showing an example of the relation between the speed level and the speed switching position N of the second setting member 62 under the state where the switching position R of the first setting member 61 is R7 and the working operation members 19L, 19R, 19D are fully stroked. In addition, the graph of FIG. 5 shows the speed level of the working machine under the state where the speed switching position N of the second setting member 62 is switched from N1 or N5 (time 0 to T1) to N2 (time T1 to T2), then to N3 or N4 (time T2 to T3), and to N1 or N5 again (time T3 and after) again. As shown in FIG. 5, the speed level of the working device can be switched to an arbitrary speed level by switching the speed switching position N of the second setting member 62.

In addition, the working machine 1 is capable of limiting the revolution speed of the prime mover E1 for each of the hydraulic actuators (the hydraulic attachments) or for each of the operations (each of the working contents).

Figure 6:
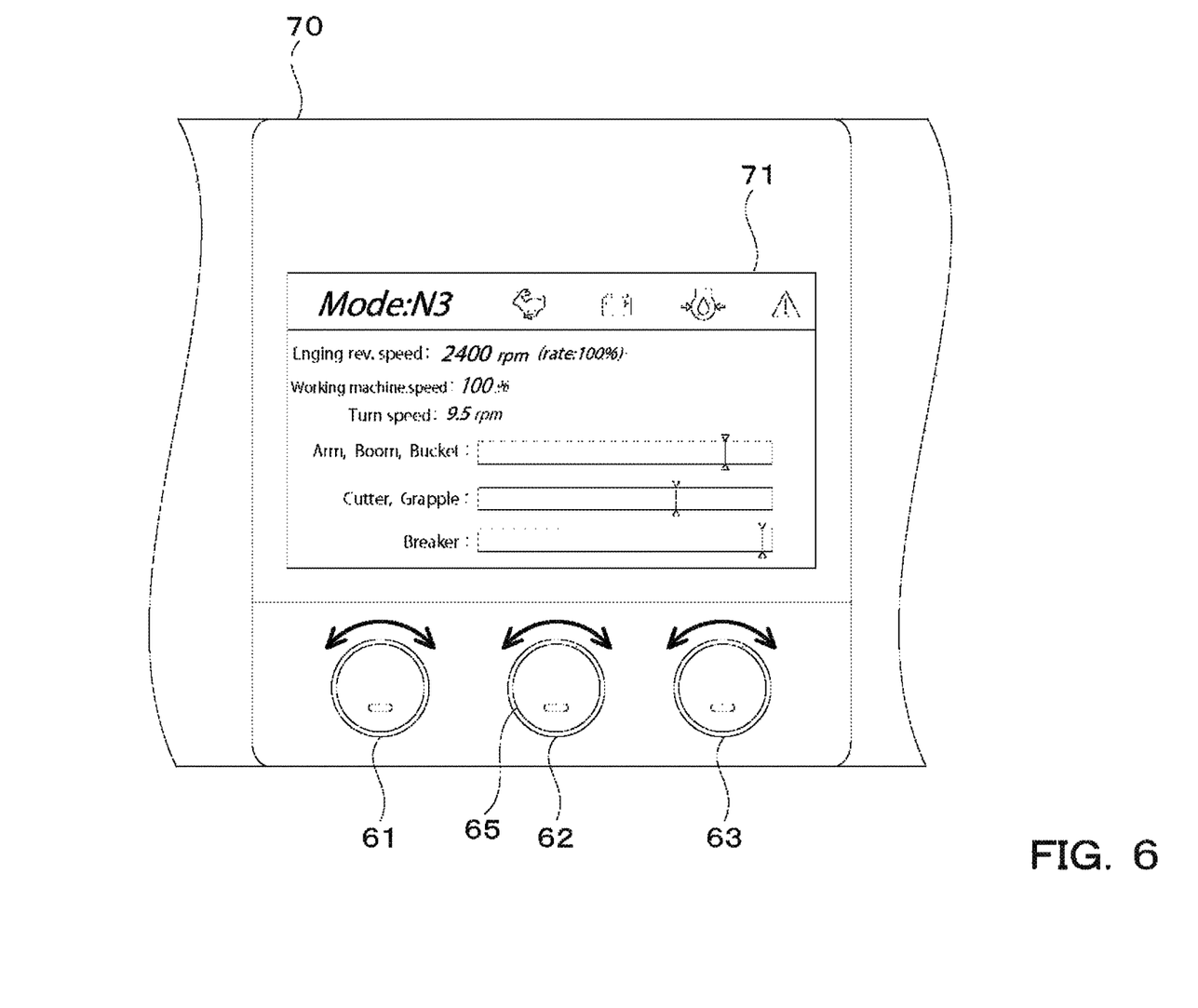
FIG. 6 is a view illustrating the first setting member, the second setting member, and a display screen according to the embodiment.

As shown in FIG. 6, the display device 70 includes a display portion 71 configured to display various types of information related to the working machine 1. The display portion 71 is constituted of a panel such as a liquid crystal panel. In the present embodiment, the operator can set the operation speed and the revolving speed of the prime mover E1 with reference to the display contents in the display portion 71. The operations of the display portion 71 and the like are performed by an operation portion including at least one of the first setting member 61 and the second setting member 62. The operation portion is constituted of a plurality of switches and the like, and includes a first setting member (a first switch) 61, a second setting member (a second switch) 62, and a third switch 63. The third switch 63 is employed as a switch not only to operated the display device 70 but also to, for example, turn on/off lights of the working machine 1 (an interior light, a boom light, a front/rear light, and the like). The operation portion may be constituted of anything and is not limited to the switch if being configured to operated the display device 70.

Note that a selector switch 65 is connected to the control device 51. In particular, the selector switch 65 is, for example, an ON/OFF switch, and is a switch that is provided in the center of the second setting member 62 and can be manually operated by the operator. When the operation signal (ON) of the selector switch 65 is inputted to the control device 51, a predetermined turn speed, for example, 9.5 rpm that is the maximum speed (100%) is set regardless of the turn speed of the turn motor set b % the first setting member 61 and the second setting member 62. When the operation signal (OFF) of the selector switch 65 is inputted to the control device 51, the first setting member 61 and the second setting member 62 are set to the turn speed corresponding to the setting. The predetermined turn speed is just an example, and may be 8 rpm, 6.5 rpm, or the like.

As described above, the working machine 1 has the first setting member 61 that receives the selection of the revolving speed setting (the switching position R) of the prime mover E1, the second setting that receives the selection of the speed setting (the speed switching position N) of the hydraulic actuator, the revolving speed controller portion 55 that controls the operation of the prime mover E1 based on the revolving speed setting, and the speed controller portion 56 that controls the operation of the hydraulic actuator based on the speed setting. The speed controller portion 56 changes the operation speed of the hydraulic actuator corresponding to the speed setting selected by the second setting member 62 in accordance with the revolving speed setting selected by the first setting member 61.

According to the configuration, while setting the revolving speed of the prime mover in accordance with a working environment and the like, the operation speed of the hydraulic actuator can be set appropriately on the basis of the revolving speed of the prime mover, a technical level of the operator, and the like. For example, in the case of an operator who cannot operate well because the operation speed becomes too high when the output of the prime mover E1 is the maximum (the maximum revolving speed), the operation speed can be set to be slower than the maximum revolving speed. In addition, it is necessary to set the revolving speed of the prime mover E1 to be low in order to reduce noise and to improve the fuel efficiency. However, in order to suppress the operation speed from being reduced, the operation speed can be set to be fast within a selectable range corresponding to the revolving speed of the prime mover E1. In addition, the operation speed can be changed while keeping the revolving speed of the prime mover E1 constant. For this reason, only by operating the second setting member 62, it is possible to easily change the operation speed to be suitable for the revolving speed of the prime mover on the basis of the operator's request. In addition, the working machine includes the storage portion 54 associates the speed levels (HI, HI2, MID, MID2, MID3, MID4, LO, CR) corresponding to each speed setting with the revolving speed setting (the switching position R) that can be selected using the first setting member 61, and stores the speed levels and the revolving speed setting. The speed controller portion 56 obtains, from the storage portion 54, the speed level (H1, HI12, MID, MID2, MID3, MID4, LO, CR) corresponding to the speed switching position N) corresponding to the revolving speed setting (the switching position R) selected using the first setting member 61 and the speed setting (the speed switching position N) selected using the second setting member 62. In this manner, the operation of the hydraulic actuator is controlled on the basis of the obtained speed level.

In this manner, the setting of revolving speed of a prime mover and the setting of the operation speed can be performed easily.

In addition, the hydraulic actuator includes a working machine actuator (the hydraulic cylinders C1 to C4, C9) configured to drive the working device and includes a turn actuator (the turn motor MT) configured to turn the turn base. The storage portion 54 corresponds the turn speed of the turn base to the working machine speed that is an operation speed of the working machine actuator at each of the plurality of speed levels, and stores the working machine speed and the turn speed. The speed controller portion 56 obtains the working machine speed and the turn speed from the storage portion 54, relating to the speed level corresponding to the revolving speed setting selected with the first setting member 61 and to the speed setting selected with the second setting member 62. And, the speed controller portion 56 controls the operation speed of the working machine actuator on the basis of the obtained working machine speed, and then controls the operation of the turn actuator on the basis of the obtained turn speed.

In this manner, the operation speed of the working machine actuator and the operation speed of the turn actuator can be appropriately set in accordance with the revolving speed of the prime mover and the speed setting required by the operator.

In addition, the first setting member 61 is a selector configured to select a required revolving speed setting among a plurality of revolving speed settings (the switching positions R). In this manner, the setting of the revolving speed of the prime mover E1 does not force a sensitive adjustment, and thereby the setting can be easily carried out.

In addition, the working machine includes a display device configured to display an input screen for performing the revolving speed setting and the speed setting. The first setting member and the second setting member are operation tools used to carry out the input operations on the input screen.

In addition, the working machine includes the display device 70 configured to display an input screen relating to the revolving speed of the prime mover E1 and to the operation speed of the hydraulic actuator. The first setting member 61 and the second setting member 62 may be operation tools for performing the input operation on the input screen.

In this manner, the input operation regarding the revolving speed of the prime mover E1 and the operation speed of the hydraulic actuator can be easily performed. In addition, as the first setting member 61 and the second setting member 62, the operation member for operating the display device 70 may be employed. In this case, since there is no need to provide a member exclusively used as the first setting member 61 and the second setting member 62, the number of parts can be reduced.

In addition, the working machine includes a plurality of hydraulic actuators. The speed controller portion 56 stops the operation of a predetermined hydraulic actuator (the bucket cylinder C2) when a predetermined speed setting (the speed switching position N5) is selected using the second setting member 62.

In this manner, this eliminates the need to operate a predetermined hydraulic actuator, thereby improving the operability. For example, by stopping the dumping operation of the bucket 17, the dumping operation of the bucket 17 is not required, and the operation system is simplified. Thus, even an operator who is not accustomed to the operation of the working machine 1 can easily operate the working machine.

In addition, the working machine includes the control valves V1 to V10 for controlling the supply amount of operation fluid to be supplied from the hydraulic pumps P1 and P2 to the hydraulic actuator. The speed controller portion 56 changes the opening apertures of the control valves V1 to V10 to control the operations of the hydraulic actuators.

In this manner, the flow rate of the operation fluid to be supplied to the hydraulic actuator is adjusted based on the working speed set by the second setting member 62, thereby easily changing the operation speed.

In addition, the presence or absence of the engine speed sensing control may be set based on the revolving speed setting of the prime mover E1, and the presence or absence of the warm-up operation also may be set based on the same.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:
1. A working machine comprising:
a prime mover;
a hydraulic pump to be driven by power of the prime mover to output operation fluid;
a hydraulic actuator to be actuated by the operation fluid outputted from the hydraulic pump;
a first setting member to accept selection of a set revolving speed of the prime mover;
a second setting member to accept selection of a set speed of the hydraulic actuator;
a revolving speed controller portion to control operation of the prime mover based on the set revolving speed; and
a speed controller portion to control operation of the hydraulic actuator based on the set speed,
wherein the speed controller portion being configured to change an operation speed of the hydraulic actuator in accordance with the set revolving speed accepted by the first setting member, the operation speed of the hydraulic actuator corresponding to the set speed accepted by the second setting member.
2. The working machine according to claim 1, comprising
a storage portion to associate the set revolving speed selected by the first setting member with a speed level corresponding to the set speed and store the set revolving speed and the speed level,
wherein the speed controller portion obtains, from the storage portion, the speed level corresponding to both the set revolving speed accepted by the first setting member and the set speed accepted by the second setting member, and controls the operation of the hydraulic actuator based on the obtained speed level.
3. The working machine according to claim 2, comprising
a working machine actuator serving as the hydraulic actuator to drive a working device; and
a turn actuator serving as the hydraulic actuator to turn a turn base,
wherein the storage portion associates, at the speed level, a working machine speed that is an operation speed of the working machine actuator with a turn speed of the turn base and stores the working machine speed and the turn speed,
and wherein the speed controller portion obtains, from the storage portion, the working machine speed and the turn speed corresponding to the speed level that corresponds to both the set revolving speed accepted by the first setting member and the set speed accepted by the second setting member, controls an operation speed of the working machine actuator based on the obtained working machine speed, and controls operation of the turn actuator based on the obtained turn speed.
4. The working machine according to claim 1, comprising
a display device to display an input screen relating to both a revolving speed of the prime mover and the operation speed of the hydraulic actuator;
wherein the first setting member and the second setting member are operation tools used for an input operation to the input screen.
5. The working machine according to claim 1, comprising
a plurality of the hydraulic actuators;
wherein the speed controller portion stops the operation of a predetermined one of the hydraulic actuators when a predetermined one of the set speed is accepted by the second setting member.
6. The working machine according to claim 1, comprising
a control valve to control a supply rate of the operation fluid to be supplied from the hydraulic pump to the hydraulic actuator,
wherein the speed controller portion changes an opening aperture of the control valve to control the operation of the hydraulic actuator.

* * * * *

(12) EX PARTE REEXAMINATION CERTIFICATE (203rd)
Ex Parte Reexamination Ordered under 35 U.S.C. 257

United States Patent
Horii

(10) Number: US 10,934,686 C1
(45) Certificate Issued: Dec. 29, 2021

(54) WORKING MACHINE

(71) Applicant: KUBOTA CORPORATION, Osaka (JP)

(72) Inventor: Hiroshi Horii, Sakai (JP)

(73) Assignee: Kubota Corporation

Supplemental Examination Request:
No. 96/000,360, May 18, 2021

Reexamination Certificate for:
Patent No.: 10,934,686
Issued: Mar. 2, 2021
Appl. No.: 16/711,017
Filed: Dec. 11, 2019

Related U.S. Application Data

(63) Continuation of application No. PCT/JP2018/015721, filed on Apr. 16, 2018.

(30) Foreign Application Priority Data

Jun. 29, 2017 (JP) .............................. JP2017-127527

(51) Int. Cl.
*E02F 9/22* (2006.01)
*F15B 11/17* (2006.01)
*F15B 21/08* (2006.01)

(52) U.S. Cl.
CPC .......... *E02F 9/2203* (2013.01); *E02F 9/2235* (2013.01); *E02F 9/2296* (2013.01); *F15B 11/17* (2013.01); *F15B 21/08* (2013.01); *F15B 2211/75* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,360, please refer to the USPTO's public Patent Application Information Retrieval (PAIR) system under the Display References tab.

*Primary Examiner* — Peter C English

(57) ABSTRACT

A working machine includes a prime mover, a hydraulic pump to be driven by power of the prime mover to output operation fluid, a hydraulic actuator to be actuated by the operation fluid outputted from the hydraulic pump, a first setting member to accept selection of a set revolving speed of the prime mover, a second setting member to accept selection of a set speed of the hydraulic actuator, a revolving speed controller portion to control operation of the prime mover based on the set revolving speed, and a speed controller portion to control operation of the hydraulic actuator based on the set speed. The speed controller portion being configured to change an operation speed of the hydraulic actuator in accordance with the set revolving speed accepted by the first setting member, the operation speed of the hydraulic actuator corresponding to the set speed accepted by the second setting member.

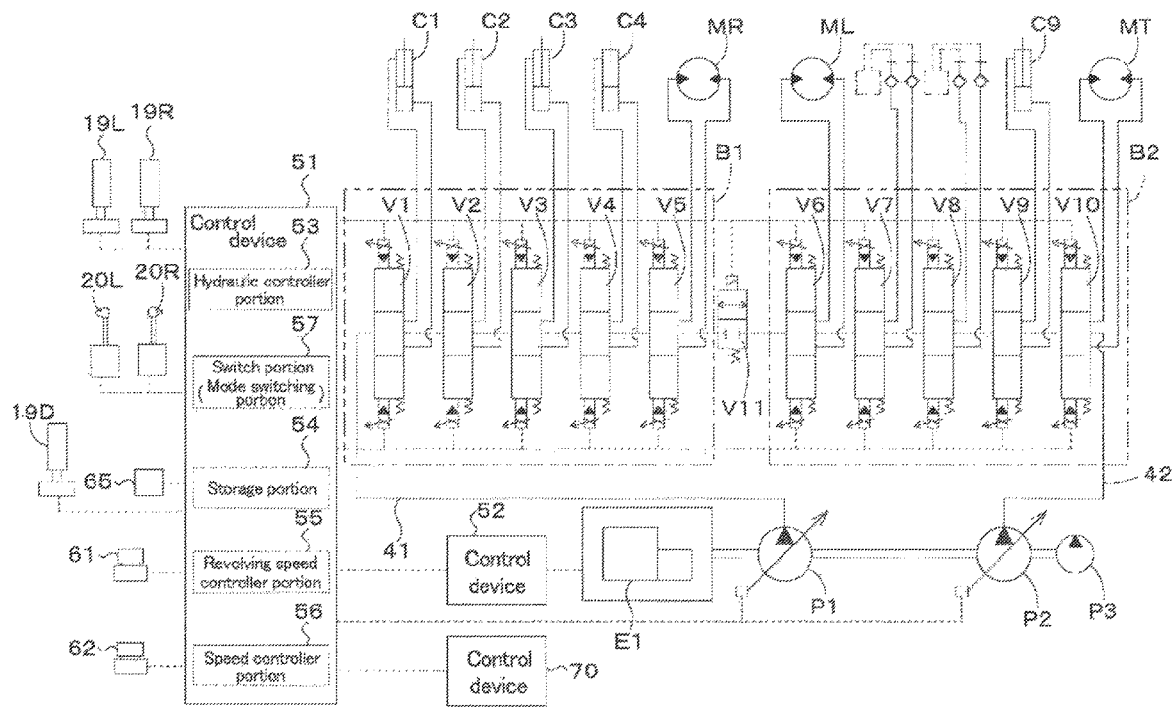

US 10,934,686 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION BY AMENDMENT ARE PRINTED HEREIN.

Column 5 line 14-34:

As shown in FIG. 1, the control [s] stem] *system* of the working machine 1 includes a plurality of control devices 51 and 52. The control device 51 is an operating control device configured to mainly control the hydraulic system, and includes a hydraulic controller portion 53. The hydraulic controller portion 53 is constituted of an electronic/electric circuit, a computer program, and the like provided in the control device 51. The hydraulic controller portion 53 controls hydraulic equipment provided in the working machine 1, for example, the plurality of control valves V1 to V10, the communication valve V11, and the hydraulic pumps (the first hydraulic pump P1 and the second hydraulic pump P2). The hydraulic controller portion 53 may be constituted of anything as long as it controls the hydraulic device, and the control target is not limited to the hydraulic device of this embodiment. The control device 52 controls the prime mover E1. In this embodiment, the control system includes a plurality of control devices [511] *51* and 52. However, the control devices 51 and 52 may be constituted of one control device, and the number of the control device is not limited thereto.

AS A RESULT OF REEXAMINATION, IT HAS BEEN DETERMINED THAT:

Claims 2-6 are cancelled.

Claim 1 is determined to be patentable as amended.

New claims 7-11 are added and determined to be patentable.

1. A working machine comprising:
   a prime mover;
   a hydraulic pump [to be] driven by [power of] the prime mover to output operation fluid;
   a hydraulic actuator [to be] actuated by the operation fluid [outputted] from the hydraulic pump;
   *an operation member operated by an operator to change an operation extent of the operation member;*
   a first [setting member to accept selection of a set revolving speed of the prime mover] *selector for the operator to select one of plural revolution switching positions, each of the revolution switching positions assigning a respective targeted revolving speed of the prime mover*;
   a second [setting member to accept selection of a set speed of the hydraulic actuator] *selector for the operator to select one of plural speed switching positions*;
   *a memory storing a plurality of speed levels, each of the speed levels defining a maximum value of an operation speed of the hydraulic actuator for a respective combination pair of a selected one of the plural revolution switching positions and a selected one of the plural speed switching positions;*
   a [revolving speed] *revolution* controller portion *configured* to control [operation of] the prime mover [based on the set revolving speed; and] *to operate at the respective targeted revolving speed assigned to a selected one of the plural revolution switching positions;*
   *a hydraulic controller portion configured to increase the operation speed of the hydraulic actuator as the operation extent of the operation member increases; and*
   a speed controller portion *configured* to [control operation of the hydraulic actuator based on the set speed, wherein the speed controller portion being configured to change an operation speed of the hydraulic actuator in accordance with the set revolving speed accepted by the first setting member, the operation speed of the hydraulic actuator corresponding to the set speed accepted by the second setting member] *maintain the operation speed of the hydraulic actuator at the maximum value defined by one of the stored speed levels after the operation speed is increased and reaches the maximum value with the operation extent further increased.*

7. *The working machine according to claim 1, further comprising:*
   *a detector to detect the operation extent of the operation member and to input the detected operation extent to a control device that includes the speed controller portion; and*
   *an electromagnetic control valve to control a supply rate of the operation fluid supplied from the hydraulic pump to the hydraulic actuator.*

8. *The working machine according to claim 1, wherein the hydraulic actuator is a first of a plurality of hydraulic actuators including a hydraulic turn actuator which turns a turn base of the working machine, and a working hydraulic actuator which actuates a working device of the working machine.*

9. *The working machine according to claim 1, wherein the hydraulic actuator includes a bucket actuator which actuates a bucket, and*
   *wherein the second selector allows the operator to select a bucket stopping position that stops the bucket actuator from actuating the bucket.*

10. *The working machine according to claim 1, wherein the first selector is a jog dial or dial switch, and the second selector is a jog dial or dial switch.*

11. *The working machine according to claim 1, wherein the speed levels include a HI speed level, a MID speed level and a LO speed level,*
    *the HI speed level defines a HI maximum value of the operation speed,*
    *the MID speed level defines a MID maximum value of the operation speed,*
    *the LO speed level defines a LO maximum value of the operation speed, and*
    *the MID maximum value is less than the HI maximum value, and the LO maximum value is less than the MID maximum value.*

* * * * *